United States Patent
Moon et al.

(10) Patent No.: US 8,584,101 B2
(45) Date of Patent: Nov. 12, 2013

(54) APPARATUS AND METHOD FOR AUTOMATICALLY ANALYZING PROGRAM FOR DETECTING MALICIOUS CODES TRIGGERED UNDER SPECIFIC EVENT/CONTEXT

(75) Inventors: Jung Hwan Moon, Daejeon (KR); Won Ho Kim, Daejeon (KR); Ki Wook Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1398 days.

(21) Appl. No.: 12/270,897

(22) Filed: Nov. 14, 2008

(65) Prior Publication Data

US 2009/0158260 A1    Jun. 18, 2009

(30) Foreign Application Priority Data

Dec. 17, 2007    (KR) .................. 10-2007-0132763

(51) Int. Cl.
*G06F 9/44*    (2006.01)
(52) U.S. Cl.
USPC ......................................... 717/133; 717/130
(58) Field of Classification Search
USPC .................................................. 717/133, 130
See application file for complete search history.

(56) References Cited

U.S. PATENT DOCUMENTS

| | | | | |
|---|---|---|---|---|
| 5,050,168 A | * | 9/1991 | Paterson | 714/35 |
| 6,083,281 A | * | 7/2000 | Diec et al. | 717/128 |
| 6,327,699 B1 | * | 12/2001 | Larus et al. | 717/128 |
| 6,959,431 B1 | * | 10/2005 | Shiels et al. | 717/124 |
| 7,814,544 B1 | * | 10/2010 | Wilhelm | 726/22 |

FOREIGN PATENT DOCUMENTS

| | | |
|---|---|---|
| KR | 1020050066048 A | 6/2005 |
| KR | 1020060055147 A | 5/2006 |
| KR | 1020070049511 A | 5/2007 |

OTHER PUBLICATIONS

Andreas Moser, et al; "Exploring Multiple Execution Paths for Malware Analysis", 2007 IEEE Symposium on Security and Privacy, pp. 231-245.

* cited by examiner

*Primary Examiner* — Li B Zhen
*Assistant Examiner* — Hang Pan
(74) *Attorney, Agent, or Firm* — Ladas & Parry LLP

(57) ABSTRACT

Provided is an apparatus and method for automatically analyzing a program in order to detect window malicious codes that are programmed to perform malicious behaviors when a specific event occurs, when the specific event does not occur, when a specific program execution condition is satisfied, and when the specific program execution condition is not satisfied.

8 Claims, 3 Drawing Sheets

APPARATUS AND METHOD FOR AUTOMATICALLY ANALYZING PROGRAM FOR DETECTING MALICIOUS CODES TRIGGERED UNDER SPECIFIC EVENT/CONTEXT

CROSS-REFERENCE TO RELATED APPLICATION

This application claims priority to and the benefit of Korean Patent Application No. 2007-132763, filed Dec. 17, 2007, the disclosure of which is incorporated herein by reference in its entirety.

BACKGROUND

1. Field of the Invention

The present invention relates to an apparatus and method for automatically analyzing a behavior of an application program operating in an operating system, and more particularly, to an apparatus and method for automatically analyzing a program in order to detect malicious codes that are programmed to perform malicious behaviors only when a specific event occurs or when a specific program execution condition is satisfied.

2. Discussion of Related Art

Current malicious code analysis is generally performed by a security company that creates a pattern for detecting malicious codes through the malicious code analysis. The malicious code analysis takes at least one or two hours, or more than one day depending on the capability of an analyzer or an analysis interference level of the malicious code. Also, a malicious code detecting scheme by pattern matching cannot positively cope with a new malicious code or a variant of an existing malicious code, which does not have the corresponding malicious code sample.

In particular, malicious codes such as Trojan horse, backdoor, and Bot normally operate like other Windows application programs in a general situation, but are triggered to perform malicious behaviors only when a specific event incurs, or when a specific program execution condition is satisfied. The specific event may include, for example, receiving a specific packet via a network, downloading a command through accessing an external Universal Resource Locator (URL), etc. The specific program execution condition may include, for example, a specific time, a case other than a debugging mode, a case other than a virtual machine, etc. Since a normal behavior and a malicious behavior coexist in one program and the malicious behavior generally does not work, it is difficult to accurately analyze it with automatic analysis based on a static/dynamic analysis scheme.

As to the static analysis scheme, there are various techniques disturbing the static analysis. Particularly, in the case of compressed execution file, since only a decompressed portion of the file is analyzed through the static analysis, it is difficult to analyze what kind of behavior the actual file performs.

In order to overcome the above limitation of the static analysis, a program behavior analysis schemes using dynamic analysis is widely being studied. A representative example of the dynamic analysis scheme is a sandbox analysis scheme. The sandbox analysis scheme executes a program suspected as a malicious code, separately from a currently used system, and observes behaviors of the program in many ways, for example, application program interface (API) hooking. However, the dynamic analysis scheme also may not accurately analyze behaviors of malicious codes such as Trojan horse, backdoor, and Bot. Since the malicious codes are likely to be programmed to detect that its executing environment is in sandbox and to perform only normal operations, there is some constraint on such analysis.

SUMMARY OF THE INVENTION

The present invention is directed to an apparatus and method for accurately analyzing behaviors of a malicious code programmed to perform malicious behavior only when a specific event occurs or when a specific program execution condition is satisfied.

The present invention is also directed to an apparatus and method for automatically analyzing behaviors of a malicious code that waits for a specific event, or is triggered only when a program execution environment satisfies a specific condition, through forced execution that ensures executing each event handler and each statement in a program at least once both when a certain execution condition is satisfied and is not satisfied.

One aspect of the present invention provides an apparatus for automatically analyzing a program, including: an automatic analysis engine for analyzing statements in a program and generating program execution information by forcefully executing each statement in the program; an execution information database for storing the program execution information generated by the automatic analysis engine; an execution flow analyzer for analyzing execution flow of the program based on the execution information stored in the execution information database; and an execution result provider for providing a user with an execution result based on the execution flow information analyzed by the execution flow analyzer.

Another aspect of the present invention provides a method of automatically analyzing a program, including: analyzing statements in a program, generating and storing program execution information by forcefully executing each statement in the program; analyzing execution flow of the program based on the stored execution information; and providing a user with an execution result based on the analyzed execution flow information.

Here, the forced execution may include: determining whether the statement is a conditional branch or an API call; when the statement is determined to be the conditional branch, executing both a statement branched when a branch condition is satisfied and a statement branched when the branch condition is unsatisfied; when the statement is determined to be the API call, determining whether a call processing scheme is normally executed; and when it is determined to be normal execution, performing the API call and otherwise, executing a handler registered by the user.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, the present invention will be described in detail with reference to embodiments shown in the accompanying drawings. However, the detailed descriptions are suggested for exemplary purposes of the present invention and thus the present invention is not limited to a specific physical configuration.

Figure 1:
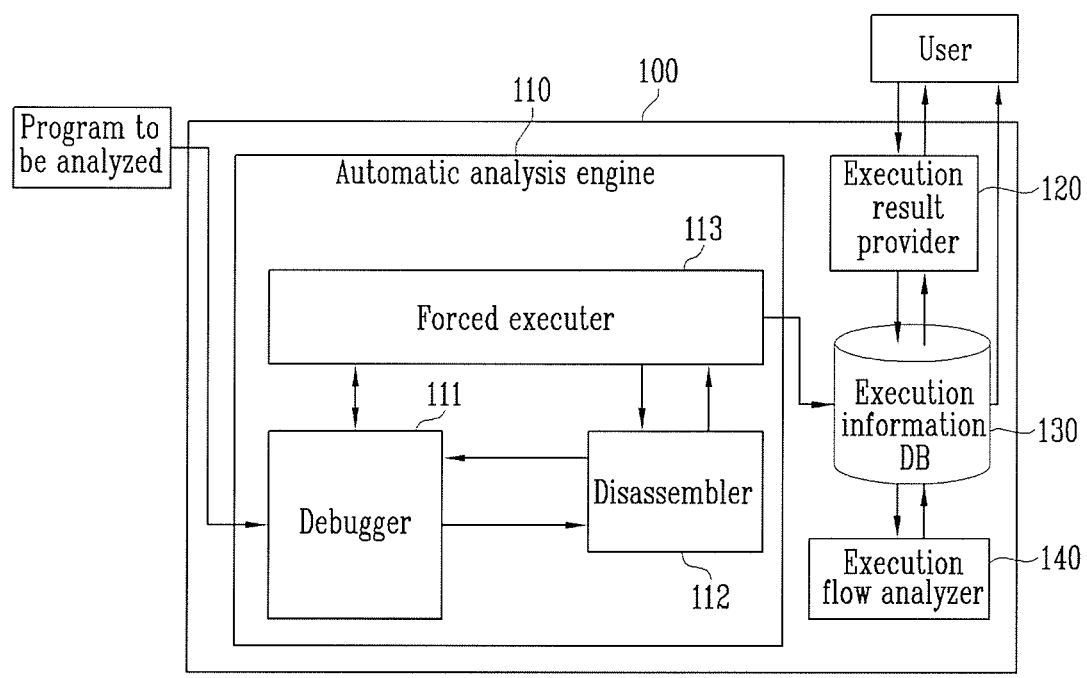
FIG. 1 is a block diagram of an apparatus for automatically analyzing a program according to an embodiment of the present invention.

FIG. 1 is a block diagram of an apparatus for automatically analyzing a program according to an embodiment of the present invention. As shown in FIG. 1, the apparatus 100 for automatically analyzing a program includes an automatic analysis engine 110, an execution information database 130, an execution flow analyzer 140, and an execution result analyzer 120.

The automatic analysis engine 110 includes a debugger 111, a disassembler 112, and a forced executer 113 in order to generate program execution information through forced execution and statement analysis of a program.

The debugger 111 is a program that executes statements in a program to be analyzed. In an embodiment, a debugger engine provided by Windows-based operating system may be used as the debugger 111. According to an embodiment of the present invention, prior to executing each statement, the debugger 111 turns over control to the forced executer 113 that determines whether forced execution is required.

The disassembler 112 converts a statement to be executed in the debugger 111 to a machine language.

The forced executer 113 analyzes the statement that is converted to the machine language by the disassembler 112, and determines whether the statement is a conditional branch or an API call to instruct the forced execution of the conditional branch and API handler to the debugger 111. For the forced execution, checkpoint for the conditional branch or the API call is stored in the execution information database 130. For example, in the case of the conditional branch, execution state information (or context) is stored as the checkpoint in the execution information database 130. In case that the execution flow is selected to branch a statement when the branch condition is satisfied, the execution state information including a register value and a memory address to be used by a program process, which have been manipulated to go to the other statement branched when the condition is unsatisfied, is stored as the checkpoint.

The feature of the present invention is to perform program analysis through forced execution that ensures at least one execution of each statement, particularly, a conditional branch statement and a statement of registering an event handler. Specifically, malicious behavior hidden in a program can be analyzed and detected by forcefully executing a certain statement that is executed only when a specific event occurs or when a specific condition is satisfied. The term "forced execution" refers to arbitrarily changing execution flow of the program by changing context of the program. For example, it is assumed that statement "jinz 0x445555" is a statement that branches to 0x445555 when zero-forcing (ZF) bit of a flag register is zero and a value of an Environmental Audio Extension (EAX) register is not zero, and otherwise, executes a subsequent statement. When forced execution is not performed, an execution flow of the program goes either to a branch at 0x445555 or to the subsequent statement. However, when forced execution is performed, the execution flow of the program goes both to the branch and the subsequent statement at least once. For example, in case of a malicious code that does distributed denial-of-service (DDos) attack on a specific site at only a specific time, it is not possible to obtain satisfactory analysis results of the malicious cod because it does not DDos attack other time except for the specific time. However, when the forced execution performs, both a case where the branch condition is satisfied in the time comparison statement and a case where the branch condition is unsatisfied in the time comparison statement are both performed and thus it is possible to verify that behavior associated with the DDos attack is included in the malicious code.

In the Windows system, since an event is generally registered by an Application Programming Interface (API), it is possible to know an address of an event handler. According to the present invention, since the execution state, i.e. context of a program, is changed using the address obtained as above, it is possible to analyze behaviors performed in all the registered event handlers even if an actual event does not occur. Also, forced execution is performed with respect to the case where the branch condition is satisfied and the case where the condition is unsatisfied in all the conditional branch statements, which results in making it possible to perform and analyze all the statements described in the program at least once.

The forced executer 113 of the present invention has following important characteristics for effective forced execution.

First, the forced executer 113 accurately maintains program context. For this, according to one embodiment, program context in checkpoint of a forced execution is stored in a stack.

Second, when a conditional branch is included in a loop, it controls one conditional branch to be executed only once in one execution flow. When a program performs the loop and a conditional branch is included in the loop, if the conditional branch is forcefully executed every time the loop is performed, execution paths may increase in geometrical order. Accordingly, the present invention aims to achieve 100% state coverage instead of code coverage in order to prevent the geometrically progressive increase in execution paths.

Third, the forced executer 113 does not let the program fall into infinite loop. For this, according to one embodiment, the forced executer 113 informs a user of time taken for execution flow by a block basis. When the user determines that it takes much time for the analysis, the forced executer 113 temporarily suspends the analysis and shows the user an analyzed code part to determine whether there is an infinite loop. In this case, when the user determines there is an infinite loop, the forced executer 113 completely suspends the current execution flow analysis and prepares another execution flow analysis.

Referring again to FIG. 1, the execution information database 130 stores checkpoint information processed by the forced executer 113 and also stores statements executed by the forced executer 113. In an embodiment, the checkpoint is stored in a stack structure.

The execution flow analyzer 140 analyzes executed statements by a function unit with reference to the execution information database 130, creates system call information, API name, a Control Flow Graph (CFG), a Call Site Flow Graph (CSFG), etc., and stores them in the execution information database 130.

The execution result provider 120 responds to user queries based on information stored in the execution information database 130. The user queries may include variable values used in a specific conditional branch, the CFG, the CSFG, the call location of a specific function, etc.

Figure 2:
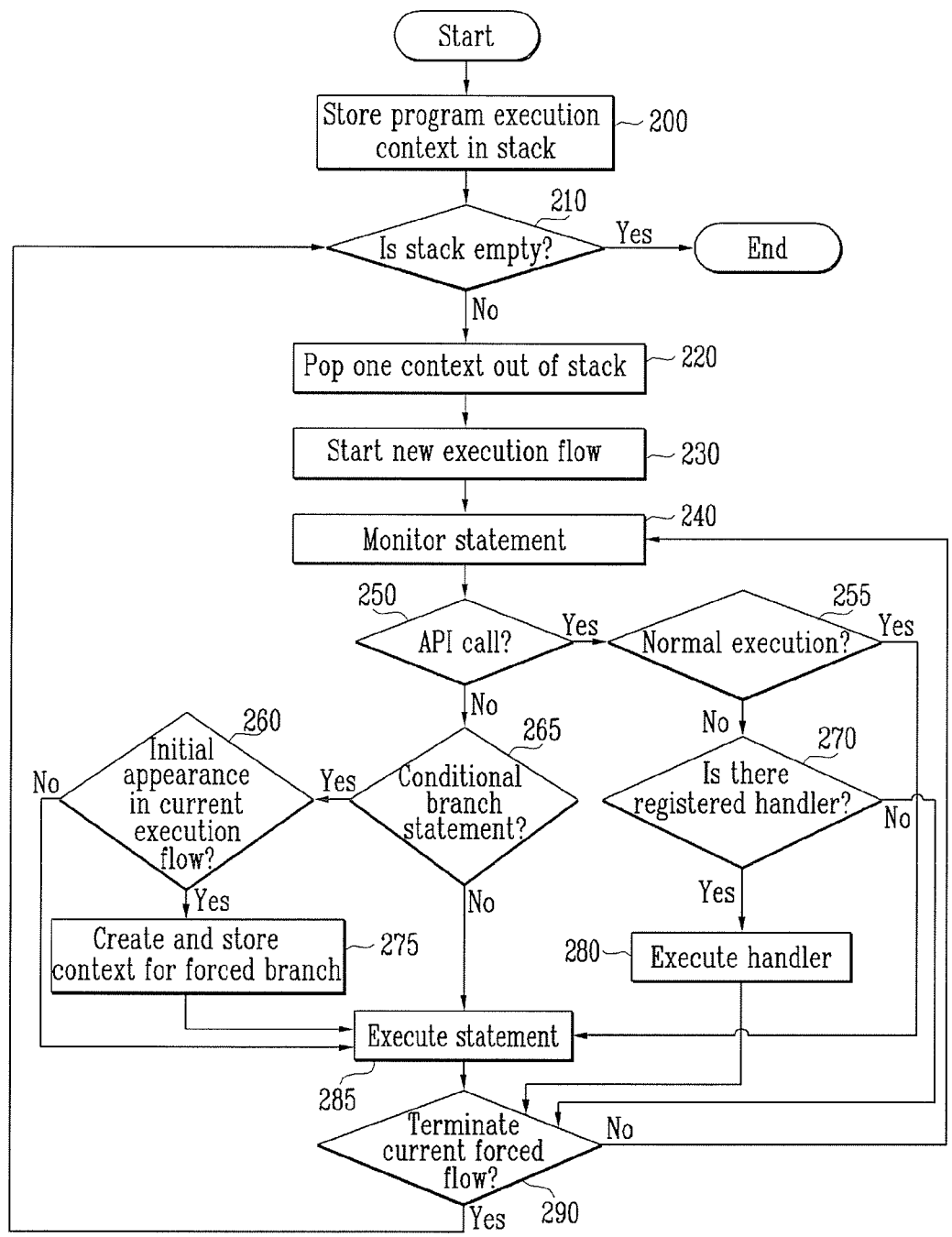
FIG. 2 is a flowchart illustrating a forced execution algorithm according to an embodiment of the present invention.

FIG. 2 is a flowchart illustrating a forced execution algorithm according to an embodiment of the present invention.

In step 200, when program analysis starts, the forced executer 113 stores process execution state (or context) information of a program to be analyzed in a stack.

In step 210, the forced executer 113 inspects the stack to determine whether context is stored in the stack. When the stack is empty, the forced execution procedure is terminated.

In contrast, when the context is stored in the stack, the forced executer 113 pops one context out of the stack in step 220, and sets the popped context as a context of a process of the program executed by the debugger 111, and starts a new execution flow in step 230.

In step 240, when the debugger 111 turns over control to the forced executer 113 prior to executing each statement, the forced executer 113 monitors a statement to be executed in the debugger 111.

In step 250, the forced executer 113 determines whether the statement is a system call or an API call. In step 255, when the statement is determined to be the system call or the API call, the forced executer 113 determines whether a call processing scheme is normal execution. In step 285, when it is determined that the call processing scheme is set to the normal execution, the forced executer 113 executes the statement. However, when it is not the normal execution, the forced executer 113 checks whether there is a handler registered by the user in step 270. When there is the registered handler, the forced executer 113 turns over program control to the registered handler to execute the handler in step 280. When it is not the normal execution and when there is no registered handler, the forced executer 113 ignores the corresponding call and goes to step 290.

In an embodiment, when CreatRemoteThread( ) or CreateThread( ) that is ThreadCreate API is called, the forced executer 113 identifies a factor of the API called from API handler, obtains a parameter and ThreadProc value, and then stores central processing unit (CPU) register information and memory region currently used by the process of the program and changes EIP to the start address of ThreadProc to thereby execute the thread. Accordingly, it is possible to analyze internal behaviors of the thread without creating the actual thread.

Similarly, with respect to API registering a callback function, it is possible to analyze behaviors of the callback function by obtaining an address of the call back function registered in the API handler and then performing forced execution on the callback function.

In step 290, when the handler execution is completed, the forced executer 113 determines whether to terminate current forced flow. Also, when there is no registered handler, the forced executer 113 determines whether to terminate current forced flow.

When it is not determined to be the API call in step 250, the forced executer 113 determines whether the corresponding statement is a conditional branch in step 265. When the corresponding statement is not the conditional branch, the forced executer executes the corresponding statement in step 285 and determines whether to terminate current execution flow in step 290. In contrast, when the corresponding statement is the conditional branch, the forced executer 113 determines whether it is the conditional branch statement initially executed in the current execution flow through comparison between an address value of the statement and the statement.

When the corresponding statement is the initially executed conditional branch, the forced executer 113 changes program context, for example, a PC or EIP, a flag register value, and a variable value used for condition comparison, for forced branch and then stores the changed program context in the stack in step 275. The variable for forced branch may be obtained by a symbolic expression matching scheme. Next, the forced executer 113 goes to step 280 to execute the corresponding statement and then goes to step 290. For example, when the conditional branch is "if (A==B) . . . ", it is expressed as combination of a statement of cmp series comparing values of A and B and a statement of Jcc series, for example, jne, je, jnz, etc. cmp is a statement to change the flag register value and execute branch of jne, je, etc., according to the changed flag register value. Here, when a=10, b=5 if(a>b) a=1; else b=1, syntax of a=1 is generally required to be executed, but syntax of b=1 may be executed at this point in time. This is the forced execution syntax. Accordingly, cmp indicates to designate subsequent EIP as b=1 for the forced execution and changes the flag resister value storing a result of a>b (cmp statement).

In contrast, when the corresponding statement is an already executed conditional branch statement, the forced executer 113 executes the corresponding statement without storing context. This is to make one conditional branch statement be performed only once in one execution flow in order to prevent repetitive increase in execution paths to be executed by the conditional branch every time each loop is performed when the conditional branch exists in the program loop.

The forced executer 113 determines whether the execution flow is terminated in step 290, and when not terminated, performs statement monitoring step 240, and when terminated, performs step 210 to start the new execution flow and check whether context is stored in the stack.

According to the present invention, the execution context of a program may change through a forced execution algorithm. Accordingly, even when an actual event does not occur, it is possible to analyze behaviors performed by all the registered event handlers. Also, since the forced execution is performed with respect to a case where the condition is satisfied and a case where the condition is unsatisfied in all the conditional branch statements, all the statements described in the program can be executed at least once. Through this, it is possible to analyze and detect behaviors of a malicious code triggered only when a specific context is satisfied or a specific event occurs.

Figure 3:
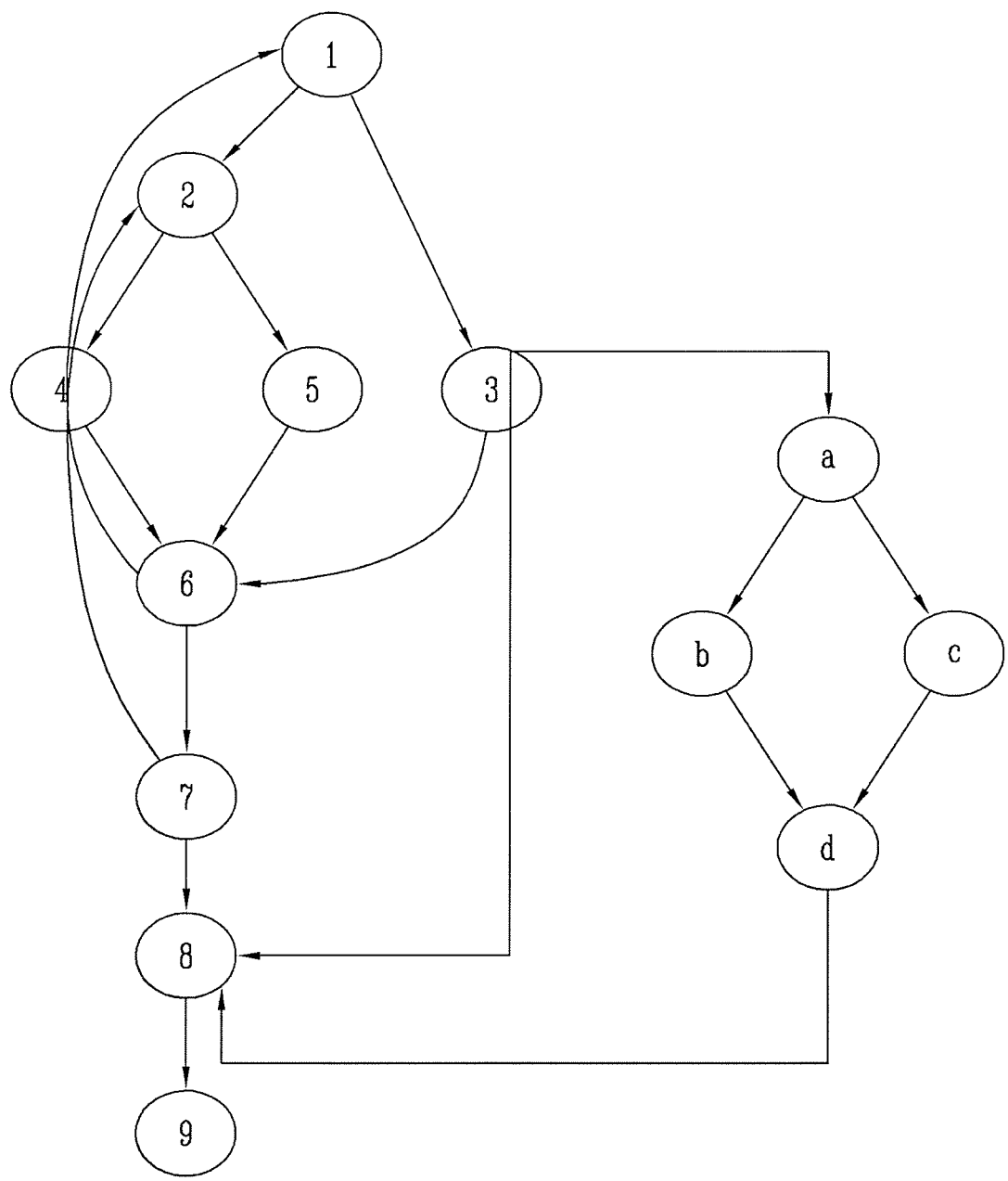
FIG. 3 illustrates an example of a forced execution process shown in FIG. 2.

FIG. 3 illustrates an example of the forced execution procedure shown in FIG. 2. In FIG. 3, it is assumed that respective nodes are program statements and the normal execution flow is 1, 2, 4, 6, 2, 4, 6, 7, 8, a, b, d, and 9. The forced execution algorithm according to the present invention is performed as follows. Expression of (checkpoint number) indicates to correct context and store the corrected context in a stack in order to enable going to a node of a corresponding number.

A first execution flow is 1(checkpoint 3), 2(checkpoint 5), 4, 6(checkpoint 7), 2, 4, 6, 7(checkpoint 1), 8, a(checkpoint c), b, d, and 9. A second execution flow is started after restoring (checkpoint c) by steps 210 and 220 of FIG. 2 and thus is (1, 2, 4, 6, 2, 4, 6, 7, 8, a), c, d, and 9. A third execution flow is (1, 2, 4, 6, 2, 4, 6, 7), 1, 2, 4, 6, 7, 8, a(checkpoint c), b, d, and 9. Referring to the third execution flow, it can be seen that (checkpoint c) is performed again after performing a. This is because the conditional branch statement performed initially appears in the third execution flow corresponding to the current execution flow in step 260. A fourth execution flow is (1, 2, 4, 6, 2, 4, 6, 7), 1, 2, 4, 6, 7, 8, a, c, d, and 9, and a fifth execution flow is (1, 2, 4, 6), 7, 8, a(checkpoint c), b, d, and 9. When the above procedure is repeated and there is thereby no new execution flow, the forced execution algorithm is terminated.

As described above, according to the present invention, all the statements in the program are automatically executed at least once through the forced execution to analyze behavior of the program. Therefore, it is possible to analyze the behavior of a malicious program executed only when a specific event occurs or when a specific program execution condition is satisfied. According to the present invention, since time and manpower for malicious code analysis can be reduced, it is possible to rapidly cope with the malicious code.

According to the present invention, it is also possible to provide analysis result about behavior of a program, thereby enabling the analysis result to be used as reference data for determining whether the program is malicious. It is expected that analysis data about behaviors of carious programs will be used as reference data for developing a scheme that can detect new variant and unknown malicious codes.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for automatically analyzing a program, comprising:
   a computer system comprising a processor and memory;
   an automatic analysis engine operating on the computer system and adapted to analyze statements in a program and generate program execution information by forcefully executing each statement in the program;
   an execution information database for storing the program execution information generated by the automatic analysis engine;
   an execution flow analyzer operating on the computer system and adapted to analyze execution flow of the program based on the execution information stored in the execution information database;
   an execution result provider operating on the computer system and adapted to provide a user with an execution result based on the execution flow information analyzed by the execution flow analyzer;
   a forced executer operating on the computer system and adapted to check whether at least one of the statements is a conditional branch and, if it is the conditional branch, instruct the debugger to forcefully execute the conditional branch, wherein the forceful execution of the conditional branch includes the execution of both a statement branched when a branch condition is satisfied and a statement branched when the branch condition is unsatisfied;
   a debugger operating on the computer system and adapted to execute the statements in the program; and
   a disassembler operating on the computer system and adapted to convert the statements to be executed in the debugger into a machine language,
   wherein the forced executer controls the conditional branch to be executed only once in one execution flow when the conditional branch is included in a loop.

2. The apparatus of claim 1, wherein the forced executer further determines whether at least one of the statements is an API call and, if it is the API call, instructing the debugger to forcefully execute a corresponding API handler.

3. The apparatus of claim 1, wherein the forced executer informs the user of time taken for analyzing the execution flow on a block basis, and, according to the user's instruction, shows the user the analyzed statements.

4. The apparatus of claim 1, wherein the execution flow analyzer creates at least one of a Control Flow Graph (CFG) and a Call Site Flow Graph (CSFG).

5. The apparatus of claim 1, wherein the user detects a behavior of a malicious code based on the execution result provided from the execution result provider.

6. A method of automatically analyzing a program, comprising:
   analyzing statements in a program, and generating and storing program execution information by forcefully executing each statement in the program;
   analyzing execution flow of the program based on the stored execution information;
   providing a user with an execution result based on the analyzed execution flow information;
   determining whether at least one of the statements is a conditional branch and, if it is the conditional branch, forcefully executing the conditional branch, wherein the forceful execution of the conditional branch includes the execution of both a statement branched when a branch condition is satisfied and a statement branched when the branch condition is unsatisfied; and
   executing the conditional branch only once in one execution flow when the conditional branch is included in a loop.

7. The method of claim 6, wherein the forced execution comprises:
   determining whether the statement is a conditional branch or an API call;
   when the statement is determined to be the conditional branch, executing both a statement branched when a branch condition is satisfied and a statement branched when the branch condition is unsatisfied;
   when the statement is determined to be the API call, determining whether a call processing scheme is normally executed; and
   when it is determined to be normal execution, performing the API call and otherwise, executing a handler registered by the user.

8. An apparatus, comprising:
   a computer system comprising a processor and memory;
   an automatic analysis engine operating on the computer system and adapted to generate program execution information by executing each statement in a program;
   an execution flow analyzer operating on the computer system and adapted to analyze execution flow of the program based on the execution information stored in an execution information database; and
   a forced executer operating on the computer system and adapted to check whether at least one of the statements is a conditional branch and, if it is the conditional branch, forcefully executing the conditional branch, wherein the forceful execution of the conditional branch includes the execution of both a statement branched when a branch condition is satisfied and a statement branched when the branch condition is unsatisfied,
   wherein the forced executer controls the conditional branch to be executed only once in one execution flow when the conditional branch is included in a loop.

* * * * *